United States Patent
Takemoto

(10) Patent No.: US 8,194,524 B2
(45) Date of Patent: Jun. 5, 2012

(54) DATA REPRODUCTION APPARATUS

(75) Inventor: Makoto Takemoto, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 298 days.

(21) Appl. No.: 12/719,515

(22) Filed: Mar. 8, 2010

(65) Prior Publication Data

US 2010/0226236 A1 Sep. 9, 2010

(30) Foreign Application Priority Data

Mar. 6, 2009 (JP) ................................. 2009-054048

(51) Int. Cl.
*G11B 7/00* (2006.01)

(52) U.S. Cl. ................................. 369/124.01; 369/47.15

(58) Field of Classification Search ............... 369/124.1, 369/124.15, 59.1, 47.15; 711/115; 707/705, 707/913, 914; 386/54
See application file for complete search history.

(56) References Cited

U.S. PATENT DOCUMENTS 7,779,058 B2 * 8/2010 Shea .............................. 707/705

FOREIGN PATENT DOCUMENTS

JP 2008-203742 A 9/2008

* cited by examiner

*Primary Examiner* — Ali Neyzari
(74) *Attorney, Agent, or Firm* — Crowell & Moring LLP

(57) ABSTRACT

When a user requests a reproduction operation via a remote control, a microprocessor determines whether or not data on a medium of the type selected in advance by a user using the remote control can be reproduced. When the microprocessor determines that data on a medium of the selected type can be reproduced, it selectively reproduces data on the medium of the selected type. When the microprocessor determines that data on a medium of the selected type cannot be reproduced, it sequentially determines whether data on media other than media of the selected type among multiple types of media can be reproduced or not, sets the type of a medium on which data can be reproduced, which is found as a result of the determination, as the type of media to be played, and reproduces data on the medium on which data can be reproduced.

4 Claims, 3 Drawing Sheets

DATA REPRODUCTION APPARATUS

BACKGROUND OF THE INVENTION

1. Field of the Invention

The present invention relates to a data reproduction apparatus and, more particularly, to a data reproduction apparatus in which multiple types of media such as an optical disc and a memory card can be inserted so that data recorded on each medium can be selectively reproduced.

2. Description of the Related Art

Data reproduction apparatus that allow multiple media, e.g., a compact disc (CD) or other optical disc, which is inserted into and ejected from the apparatus, and a universal serial bus (USB) memory, a secure digital (SD) card, or other recording medium, which is connected to the apparatus, to be inserted therein are known in the art (see, for example, Japanese Laid-open Patent Publication 2008-203742).

The data reproduction apparatus disclosed in Japanese Laid-open Patent Publication 2008-203742 has a plurality of Play keys corresponding to the respective media and reproduces data on a medium corresponding to a Play key pressed by a user. This technique allows a user to easily change a medium to be played, but requires the plurality of Play keys corresponding to the respective types of media on the operation portion, thus making it difficult to reduce the size of the operation portion and increasing the cost.

On the other hand, another conventional data reproduction apparatus has a Play key used commonly for all types of media on its operation portion. In this apparatus, a user can select the type of media to be played at the time of setup in advance. Referring to FIG. 3, this data reproduction apparatus is described. This data reproduction apparatus 101 comprises: a digital versatile disc (DVD) drive 104 that allows a DVD 103 to be inserted into a main body 102 of the apparatus; and a SD card slot 106 to which an SD card 105 can be connected. Further, the main body 102 is connected via a network 107 to another data reproduction apparatus 108 (e.g., an HDD recorder). When data on one of the media are reproduced, the reproduced image and audio data are output to a monitor 109 connected to the main body 102 of the apparatus.

A remote control 110 has a Menu key 110a, cursor movement keys 110b, and a Play key 110c. At the time of setup, a user can press the Menu key 110a to display a menu screen 109a on the monitor 109 and can operate the cursor movement keys 110b to select the type of media to be played. In this example, DVDs are selected as media to be played. After that, when a user presses the Play key 110c, the DVD drive 104 is activated so that data on the DVD 103 placed therein are reproduced. In the case where SD cards are selected at the time of setup, data recorded on the SD card 105 are reproduced in response of the press of the Play key 110c. Likewise, in the case where network devices are selected, video data and other data recorded on the hard disc within the HDD recorder 108 are reproduced.

The above described data reproduction apparatus 101 can make it easy to reduce the size of the remote control 110 and reduce the cost of the apparatus. Further, once the type of media to be played is selected at the time of setup, data on the same type of media are always reproduced with one press of the Play key 110c. Therefore, an error in operation can be prevented. However, the data reproduction apparatus 101 may be inconvenient in the following case.

Sometimes, for example, in order to brighten up the atmosphere in the room after returning home, a user may want the apparatus to reproduce some content without regard to the type of media and to promptly output image and audio data through the monitor 109. However, in such a case, unless a medium of the selected type (e.g., a DVD) is placed in the main body 102 of the apparatus, the data reproduction apparatus 101 cannot reproduce any content even when a medium other than media of the selected type (e.g., an SD card) is connected thereto.

In the above case, the user needs to know that the DVD 103 is not placed in the apparatus because no data is reproduced, confirm whether or not another medium is connected to the apparatus, and then display the menu screen 109a so as to change the type of media to be played to the type of the medium (e.g. the SD card 105) currently connected to the main body 102 of the apparatus. The confirmation of another connected medium and the change of the type of media to be played may be cumbersome for a user. Thus, a user may feel that the data reproduction apparatus 101 is inconvenient because reproduction cannot be performed promptly, i.e., image and audio data cannot be output promptly.

Further, even when a user visually confirms a medium connected to the main body 102 of the apparatus, the medium may contain no valid data. In such a case, even after the type of media to be played is changed, image and audio data are not output to the monitor 109. Thus, the user may need to change the type of media to be played again.

SUMMARY OF THE INVENTION

An object of the present invention is to provide a data reproduction apparatus that, even when a medium of the type selected in advance by a user is not placed in or connected to the main body of the apparatus, can automatically reproduce data on another medium on which data can be reproduced without requiring a user to confirm another connected medium and change the type of media to be played, thus being user friendly.

According to an aspect of the present invention, this object is achieved by a data reproduction apparatus comprising: media selection means for a user to select in advance a type of media to be played from among multiple types of media including media placed in a main body of the apparatus and media in another data reproduction apparatus connected via a network to the main body of the apparatus; reproduction request means to be operated by a user in order to request a reproduction operation; and a microprocessor that controls the reproduction operation when a user requests the reproduction operation by operating the reproduction request means.

When a user requests the reproduction operation by operating the reproduction request means, the microprocessor determines whether or not data on a medium of the type selected by a user using the media selection means can be reproduced.

When the microprocessor determines that data on a medium of the type selected by a user using the media selection means can be reproduced, the microprocessor selectively reproduces data on the medium of the selected type.

When the microprocessor determines that data on a medium of the selected type cannot be reproduced, the microprocessor sequentially determines whether data on a medium other than media of the type selected by a user using the media selection means, among the multiple types of media, can be reproduced or not, sets a type of a medium on which data can be reproduced, which is found as a result of the determination, as a type of media to be played, and reproduces data on the medium on which data can be reproduced.

According to the above data reproduction apparatus, when a user requests the reproduction operation by operating the reproduction request means and data on a medium of the type selected using the media selection means cannot be reproduced, the microprocessor sequentially determines whether or not data on media other than media of the selected type can be reproduced, and reproduces data on a medium on which data can be reproduced. Thereby, data on a medium can be reproduced promptly without requiring a user to change the type of media to be played. Accordingly, the data reproduction apparatus is user friendly.

Preferably, when no medium on which data can be reproduced is found as a result of the determination as to whether data on each of the multiple types of media can be reproduced or not, the microprocessor outputs to a monitor a message that no data can be reproduced. This enables a user to know the reason why reproduction is not performed, based on the message, and to take an appropriate action.

The multiple types of media may include a digital versatile disc (DVD) placed in the main body of the apparatus.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
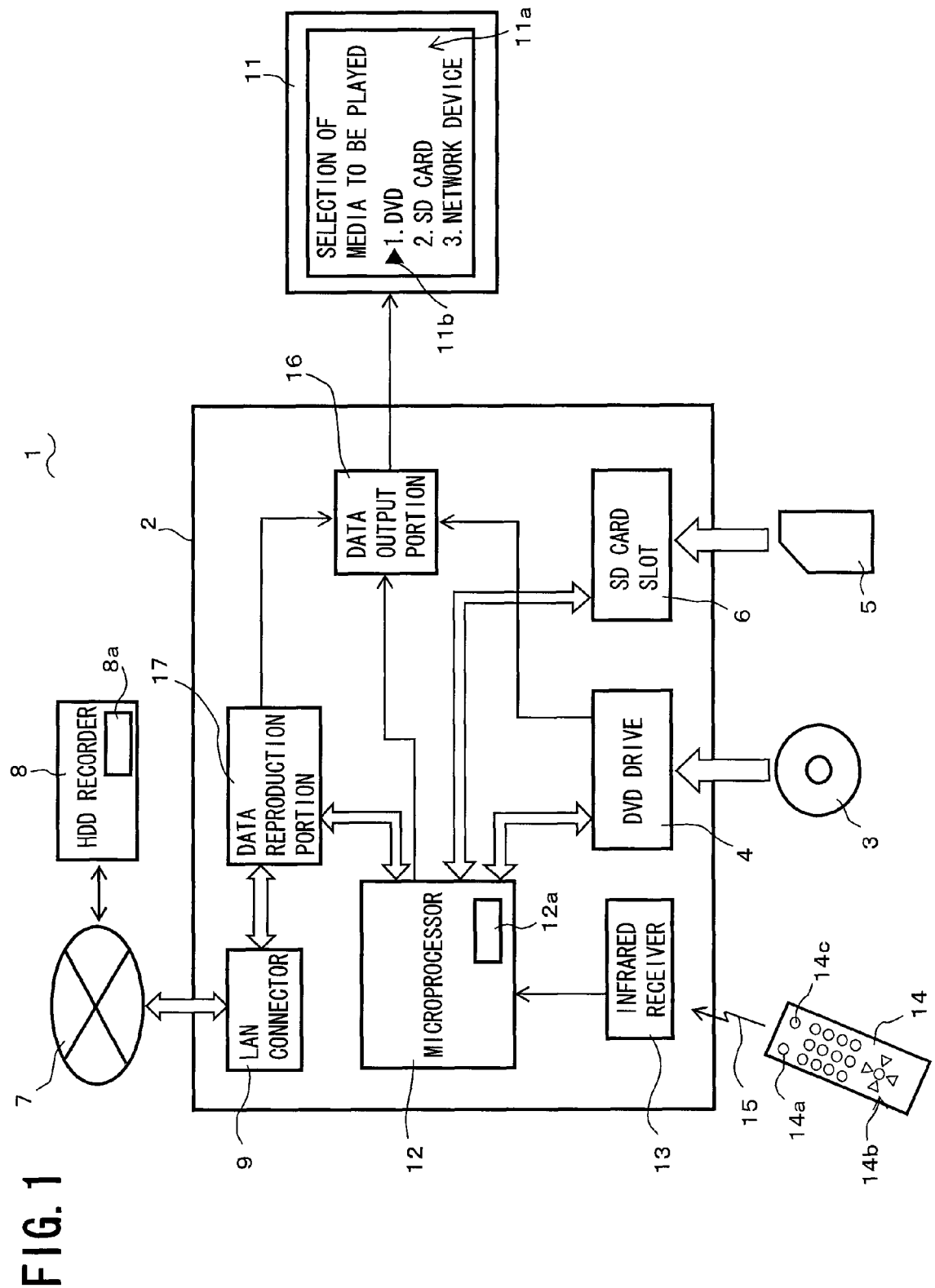
FIG. 1 is a block diagram showing a data reproduction apparatus according to one embodiment of the present invention.
Figure 2:
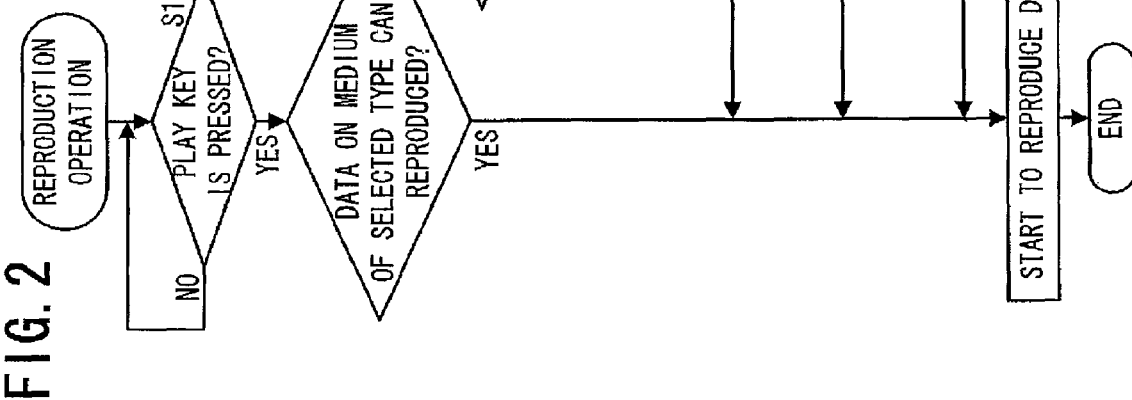
FIG. 2 is a flowchart showing the process of a reproduction operation by the data reproduction apparatus.
Figure 3:
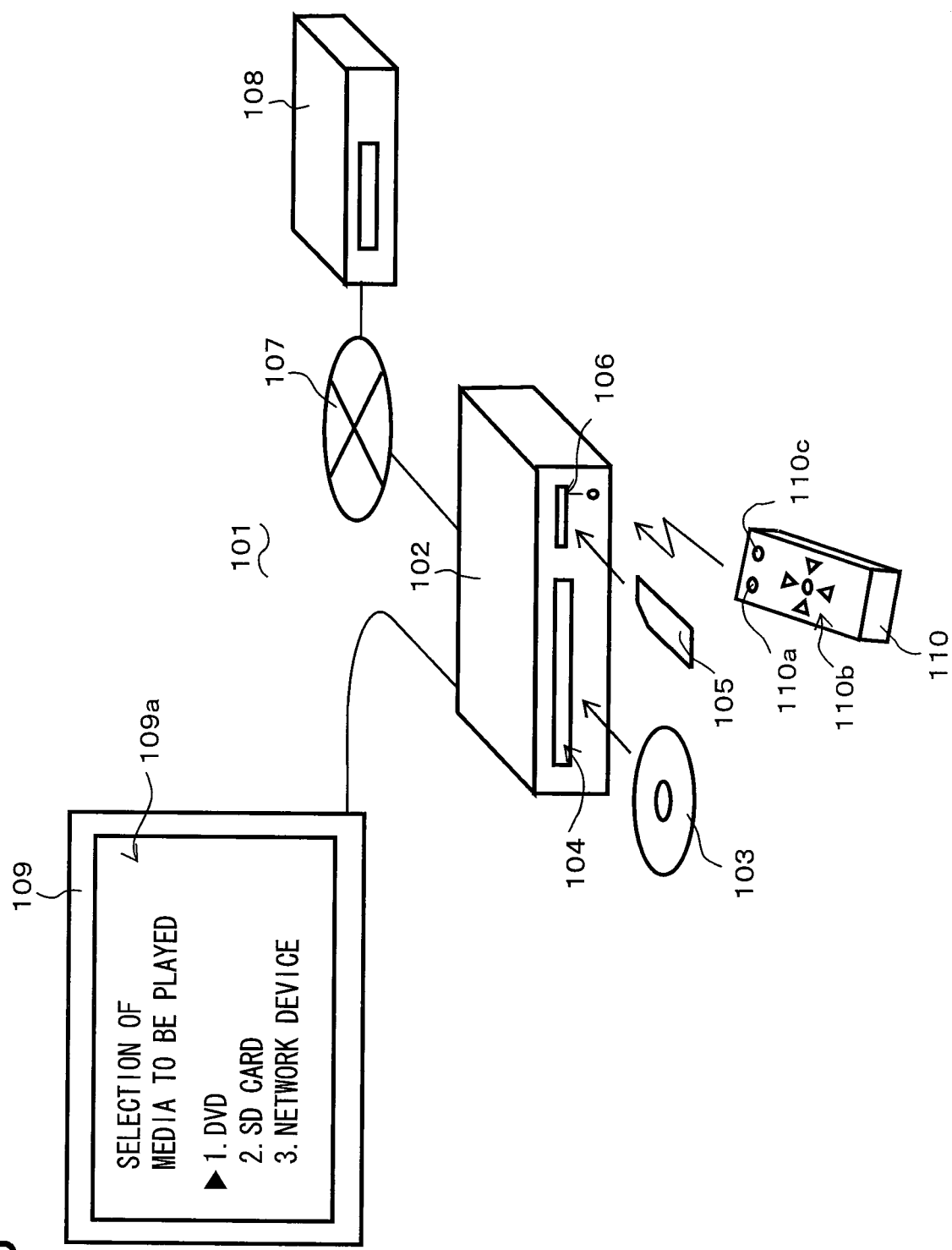
FIG. 3 shows the schematic configuration of the conventional data reproduction apparatus.

Referring now to FIG. 1 and FIG. 2, a data reproduction apparatus embodying the present invention is described. It is to be noted that the following description of preferred embodiment of the present invention has been presented for purposes of illustration and description, and is not intended to be exhaustive or to limit the present invention to the precise form disclosed.

The data reproduction apparatus 1 according to this embodiment is configured as a DVD player. As shown in FIG. 1, the data reproduction apparatus 1 comprises: a DVD drive 4 that allows a DVD 3 as a first medium to be inserted into a main body 2 of the apparatus; a SD card slot 6 that can be connected to an SD card 5 as a second medium; and a LAN connector 9 that can be connected via a network 7 to an HDD recorder 8. The HDD recorder 8 has a hard disk 8a as a third medium.

When data recorded on one of the first to third media are reproduced, the reproduced image and audio data are output to a monitor 11 connected to the main body 2 of the apparatus. The HDD recorder 8 is connected to the main body 2 using, for example, Universal Plug and Play (UPnP) method, so that the operation of the HDD recorder 8 is controlled by control signals from the main body 2 of the apparatus.

The main body 2 of the apparatus comprises a microprocessor 12 that controls the operations of the main body 2 and the HDD recorder 8. The microprocessor 12 receives a command signal 15 via an infrared receiver 13 from a remote control 14 (reproduction request means) that is operated by a user, and controls the operation of each component in the apparatus in accordance with the command signal 15. The microprocessor 12 and the remote control 14 correspond to media selection means in claims.

For example, when the microprocessor 12 receives a signal to request the display of a menu screen from the remote control 14, it reads out the menu screen stored in a ROM 12a, and outputs to the monitor 11 via a data output portion 16 serving as an interface. The menu screen 11a shows a cursor 11b and the words "DVD", "SD CARD", and "NETWORK DEVICE" arranged one above the other so that one of the media can be selected by positioning the cursor 11b.

When the DVD drive 4 operates in response to an instruction from the microprocessor 12, image and audio data reproduced from the DVD 3 are output via the data output portion 16 to the monitor 11. Data read out from the SD card 5 to the microprocessor 12 are output via the data output portion 16 to the monitor 11. Data received from the HDD recorder 8 are converted into image and audio data by a data reproduction portion 17 and output via the data output portion 16 to the monitor 11.

The remote control 14 has a Menu key 14a used for displaying the menu screen, cursor movement keys 14b used for moving a cursor on the screen, and a Play key 14c used commonly for all the media.

Referring now to FIG. 2, a reproduction operation by the data reproduction apparatus 1 is described. In the data reproduction apparatus 1, various settings are made by a user at the time of setup. In this example, DVDs have been selected as media to be played. Further, the DVD 3 is not placed in the DVD drive 4, the SD card 5 is connected to the main body 2, and the HDD recorder 8 is connected via the network 7 to the main body 2 of the data reproduction apparatus 1.

A user selects the type of media to be played by pressing the Menu key 14a on the remote control 14 to display the menu screen 11a on the monitor 11 and operating the cursor movement keys 14b to move the cursor 11b to a desired position. The microprocessor 12 stores selection information indicating which type of media are selected to be played (in this example, selection information indicating that DVDs are selected as media to be played).

After the above described selection of the type of media to be played, when the microprocessor 12 detects the press of the Play key 14c by a user (YES at S1), the microprocessor 12 determines whether or not data on a DVD that is a medium of the selected type can be reproduced (S2).

More particularly, if valid RF signals can be obtained by causing the DVD drive 4 to perform a trial reproduction operation, the microprocessor 12 determines that the DVD 3 is placed in the DVD drive 4 and data on the DVD 3 can be reproduced. If no valid RF signal can be obtained, the microprocessor 12 determines that data on a DVD cannot be reproduced.

In this example, the DVD 3 is not placed in the DVD drive 4. Thus, the result of the determination by the microprocessor 12 at the step S2 is NO, and the result of the subsequent determination at the step S3 as to whether or not data on a DVD can be reproduced is also NO, so that the process proceeds to the determination at step S5.

At the step S5, the microprocessor 12 determines whether or not data on the SD card 5 can be reproduced. More particularly, if valid data can be read from the SD card 5, the microprocessor 12 determines that data on the SD card 5 can be reproduced (YES at S5). If no valid data can be read from the connected SD card 5 because, for example, no data is recorded on the SD card 5, the microprocessor 12 determines that data on the SD card 5 cannot be reproduced (NO at S5).

In this example, the SD card 5 is connected to the apparatus. Thus, when valid data are successfully read out, the microprocessor 12 determines that data on the SD card 5 can be reproduced. Then, the microprocessor 12 changes the type of media to be played, which is stored as the selection information, from DVDs to SD cards (S6), and outputs image data and other data read from the SD card 5 to the monitor 11 (S10).

As described above, even when a user requests the reproduction operation and a medium (DVD) of the type selected in advance is not placed in the main body 2 of the apparatus, the data reproduction apparatus 1 itself can detect another medium (SD card) on which data can be reproduced, changes the type of media to be played, and then reproduces data on the another medium. Therefore, data can be promptly reproduced without requiring a user to confirm whether or not another medium is connected and change the type of media to be played. Accordingly, the data reproduction apparatus 1 is user friendly and convenient.

In the above described reproduction operation, if the SD card 5 is not connected to the SD card slot 6, the result of the determination by the microprocessor 12 at the step S5 is NO. Thus, the microprocessor 12 then determines whether or not data on a device on the network (HDD recorder 8) can be reproduced (S7). If it is determined that data able to be reproduced are recorded in the HDD recorder 8 (YES at S7), the microprocessor 12 changes the type of media to be played, which is stored therein as the selection information, to the HDD recorder 8 (S8), causes the HDD recorder 8 to reproduce data, and then outputs image data and other data recorded on the hard disk 8*a* to the monitor 11 (S10). In this case, the data reproduction apparatus 1 can also promptly reproduce data without bothering a user, thus being convenient to a user.

On the other hand, if the HDD recorder 8 is also not connected, the result of the determination by the microprocessor 12 at the step S7 is NO, so that the microprocessor 12 displays on the monitor 11 a message that no data can be reproduced (S9). More particularly, the microprocessor 12 reads out a message such as "no data can be reproduced because there is no medium inserted in the apparatus or there is no valid data", which is stored in the ROM 12*a*, and outputs it as image data to the monitor 11. In this case, a user can properly know the reason why no data is reproduced, and thus can insert the DVD 3 or take other appropriate action.

In another case where, although SD cards have been selected as media to be played at the time of setup, the SD card 5 is not connected to the main body 2 of the apparatus and the DVD 3 is placed in the main body 2, the steps S2 to S4 in the above described process are as follows.

At the step S2, the microprocessor 12 determines whether or not data on an SD card, which is a medium of the selected type, can be reproduced. In this case, the microprocessor 12 determines that data on an SD card cannot be reproduced because the SD card 5 is not connected (NO at S2). Subsequently, the microprocessor 12 determines whether or not data on a DVD can be reproduced (S3). If data on the DVD 3 placed in the DVD drive 4 can be reproduced (YES at S3), the microprocessor 12 changes the type of media to be played, which is stored as the selection information, to DVDs (S4), and causes the DVD drive 4 to reproduce data and outputs the reproduced data to the monitor 11 (S10).

It is noted that a program to execute the above described process of reproduction operation is stored in the ROM 12*a* in the microprocessor 12.

The present invention has been described above using a presently preferred embodiment, but those skilled in the art will appreciate that various modifications are possible. For example, in the above described process of reproduction operation, when data on a medium of the selected type cannot be reproduced (NO at S2), the microprocessor 12 makes the determination as to whether or not data can be reproduced, for a DVD, an SD card, and a device on the network (HDD recorder) in that order. However, this order can be changed. For example, the microprocessor 12 may make the determination, as to whether or not data can be reproduced, for a device on the network, an SD card, and a DVD in that order.

Further, the data reproduction apparatus may be configured so that a user can freely change the order of the media for which the microprocessor 12 makes the determination as to whether or not data can be reproduced, by operating the remote control 14 at the time of setup.

This application is based on Japanese patent application 2009-054048 filed Mar. 6, 2009, the contents of which are hereby incorporated by reference.

What is claimed is:

1. A data reproduction apparatus comprising:
    media selection means for a user to select in advance a type of media to be played from among multiple types of media including media placed in a main body of the apparatus and media in another data reproduction apparatus connected via a network to the main body of the apparatus;
    reproduction request means to be operated by a user in order to request a reproduction operation; and
    a microprocessor that controls the reproduction operation when a user requests the reproduction operation by operating the reproduction request means,
    wherein when a user requests the reproduction operation by operating the reproduction request means, the microprocessor determines whether or not data on a medium of the type selected by a user using the media selection means can be reproduced,
    wherein when the microprocessor determines that data on a medium of the type selected by a user using the media selection means can be reproduced, the microprocessor selectively reproduces data on the medium of the selected type, and
    wherein when the microprocessor determines that data on a medium of the selected type cannot be reproduced, the microprocessor sequentially determines whether data on a medium other than media of the type selected by a user using the media selection means, among the multiple types of media, can be reproduced or not, sets a type of a medium on which data can be reproduced, which is found as a result of the determination, as a type of media to be played, and reproduces data on the medium on which data can be reproduced.

2. The data reproduction apparatus according to claim 1, wherein when no medium on which data can be reproduced is found as a result of the determination as to whether data on each of the multiple types of media can be reproduced or not, the microprocessor outputs to a monitor a message that no data can be reproduced.

3. The data reproduction apparatus according to claim 2, wherein the multiple types of media include a digital versatile disc (DVD) placed in the main body of the apparatus.

4. The data reproduction apparatus according to claim 1, wherein the multiple types of media include a digital versatile disc (DVD) placed in the main body of the apparatus.

* * * * *